May 18, 1937.  M. A. DALOTEL  2,080,463
MACHINE FOR THE CONTINUOUS PROJECTION PRINTING OF MOVING PICTURE FILMS
Filed Jan. 14, 1935  2 Sheets-Sheet 1
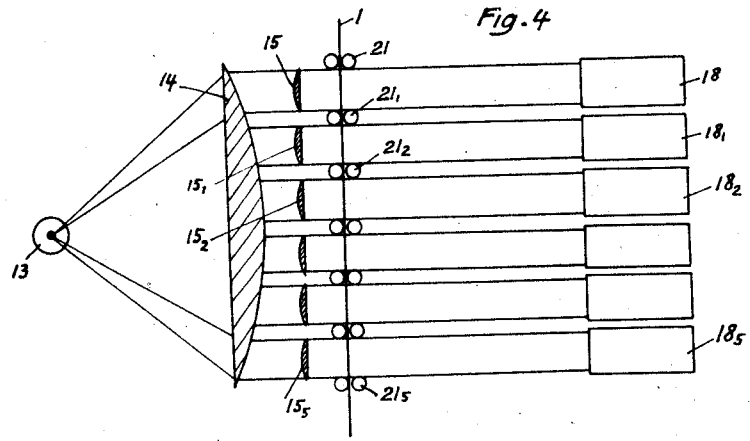
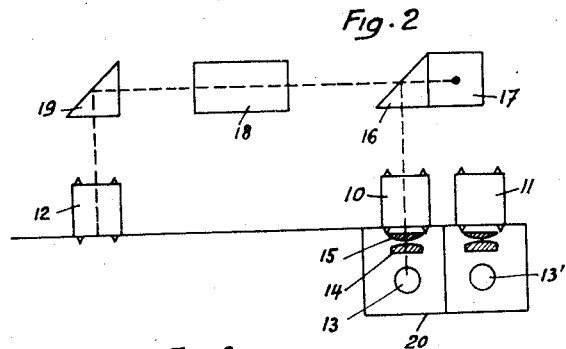
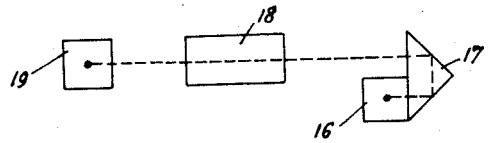
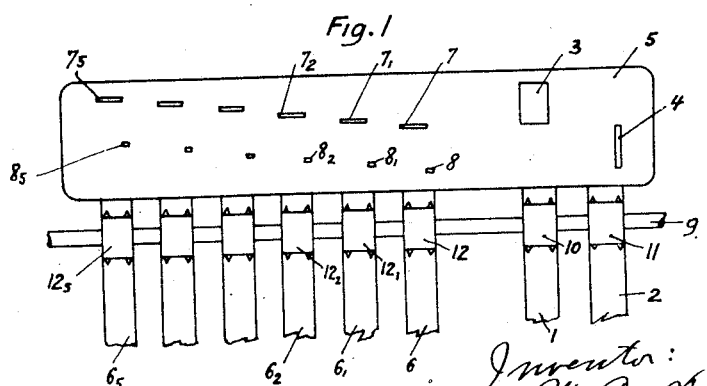

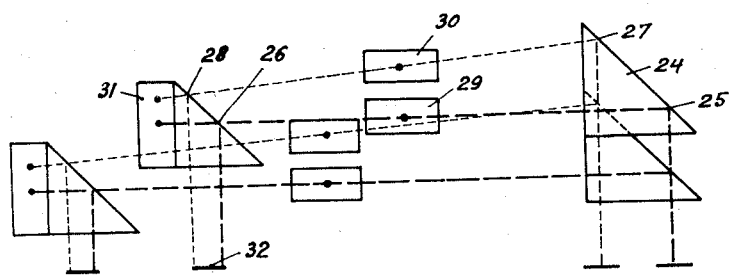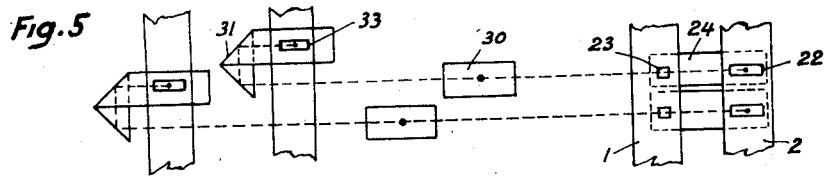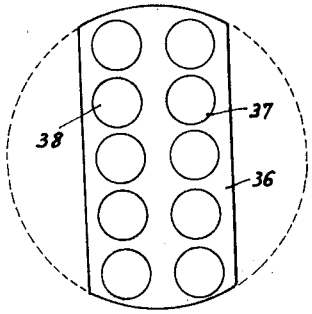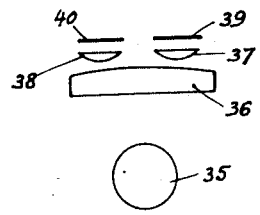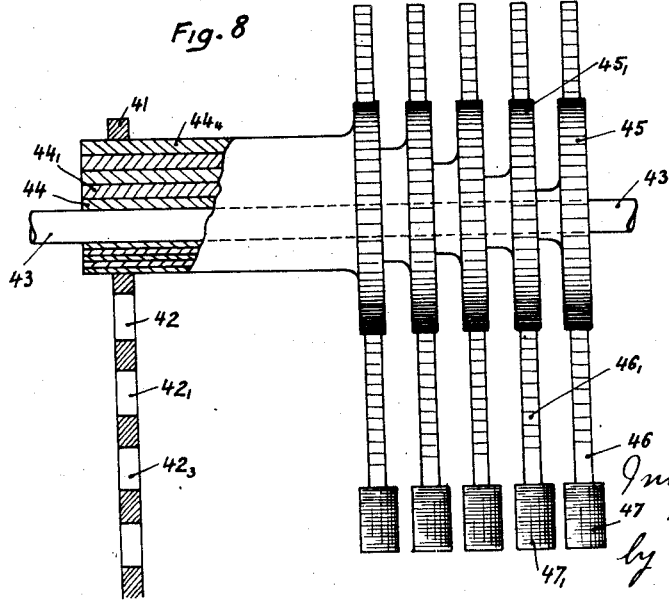

Patented May 18, 1937

2,080,463

UNITED STATES PATENT OFFICE 2,080,463

MACHINE FOR THE CONTINUOUS PROJECTION PRINTING OF MOVING PICTURE FILMS

Maurice Albert Dalotel, Colombes, France

Application January 14, 1935, Serial No. 1,802
In France January 19, 1934

4 Claims. (Cl. 88—24)

The present invention concerns a machine for the continuous projection printing of one or more negative films onto a number of positive films simultaneously, of the type in which all the films, the positive as well as the negative ones, are arranged next to one another, optical projecting systems, in a number equal, for each negative, to that of the positive films to be printed, being arranged to project respectively on each positive different adjacent regions of the negative or negatives.

It is known that in the existing machines of this type, the negative and positive films are driven in opposite directions, with the result that the synchronization and the absolute regularity of the advance of the films, which are essential features for continuous printing, are rendered very difficult. This travel in opposite directions, of the positive and the negative films, is obtained by arranging the means driving the respective films, either on two distinct shafts, or on a single shaft, one sort of films, for instance the negatives, passing, in the latter case, in front of their sprocket wheels, and the other sort, for instance the positives, behind their sprocket wheels. It will be obvious that in the first case, the perfect synchronism is difficult to obtain and that, furthermore, the apparatus is cumbersome and complicated. In the second case if, according to the usual practice, the guide-passages of all the films, positive or negative are arranged on the same side with respect to the driving shaft, the synchronous and smooth drive is absolutely impossible, since one part of the films is being pulled through the said guide-passages whilst the other part of the films is being pushed through the passages, so that this device may only be used for intermittent printing with shutters. If, on the other hand, the guide-passages for the negative and the positive films are arranged respectively on either side of the driving shaft, the above drawback does no longer exist, but the projection systems become extremely complicated, since the illuminated regions of the negative films have to be projected on regions of the positive films, which are displaced with respect to the former, both laterally and in height.

The object of the machine of the present invention is to remedy these drawbacks, and it is characterized by the fact that all the films, positive and negative, are driven in the same direction, the films all being drawn by a single shaft, whilst the optical systems comprise means, such as prisms or mirrors for compensating the turning over of the images, upside down, due to the objectives.

A further object of the invention is to provide, apart from the absolute synchronism in the driving of the films, also a perfect luminous synchronism, i. e. means enabling to print all the positive films with a constant amount of light, which is equal for all the films, or to cause this amount of light to vary simultaneously and by equal quantities for all the positives.

The invention will be more readily understood by referring to the following description and to the annexed drawings, in which:

Figure 1 is a fragmentary front view of the machine showing the plate with the guide-passages, and the driving shaft.

Figures 2 and 3 show respectively in plan and in elevation the devices enabling the compensation of the turning over, upside down, of the images.

Figure 4 is a diagrammatic plan view of the devices for the illumination of a negative film.

Figure 5 represents in plan on its upper side and in elevation on its lower side, the projection device of an image negative and of a sound negative.

Figures 6 and 7 represent in plan and in elevation the illumination of the two negatives by a single lamp.

Figure 8 represents a device for the adjustment of the intensity of the projected light beams.

Referring to Figure 1, it is seen that the different regions of the image negative 1 and of the sound negative film 2, seen through the high windows 3 and 4 provided in the guiding plate 5, are projected, in a known manner, at different heights, on the positive films 6, 6$_1$, 6$_2$ . . . through narrow windows stepped in height: 7, 7$_1$, 7$_2$ . . . for the image, and 8, 8$_1$, 8$_2$ . . . for the sound, which are provided in the same plate 5. All the films, the negative as well as the positive, are driven by the same shaft 9, on which are mounted the sprocket wheels 10, 11 of the negatives 1 and 2, and the sprocket wheels 12, 12$_1$, 12$_2$ . . . of the positive films to be printed.

For enabling the drive of the negative and the positive films in the same direction, means are joined, according to the invention, to each projection system of known type, constituted by two totally reflecting prisms and an objective, said means enabling the compensation of the turning over, upside down, of the image given by said objective without however suppressing the turning over, left to right, of the image. These means are represented in Figures 2 and 3.

The image film 1 passes over the regulating wheel 10 (Figure 2), the illumination being obtained by the lamp 13 through a condensing system 14—15 which will be described below; the beam of light falls for instance on a totally reflecting prism 16 with vertical edges, stuck to a totally reflecting prism 17 with horizontal edges, then the beam passes through the objective 18 and after it has left the latter, it is sent back by the totally reflecting prism 19 with vertical edges, onto the positive film 6 driven by the regulating wheel 12. Owing to this system of prisms, the images are not turned upside down, so that one may drive all the films, the negative as well as the positive, in the same direction, as indicated above.

The two illuminating lamps 13 and 13' (Figure 2) serving, one for the image negative, and the other for the sound negative, are arranged, as the two negatives 1 and 2 at the right hand end of the machine, and are enclosed in a single box 20, preferably automatically operable, i. e. opening and closing automatically, at the desired moment, without shocks that would rapidly destroy the lamps 13 and 13'.

According to Figure 4, the negative film to be copied is illuminated by a lamp 13 arranged at the focus of a lens 14, the diameter of which is at least equal to the length of the strip to be illuminated; this lens 14 sends out parallel beams on as many small lenses 15, $15_1$, $15_2$, $15_3$ ... placed adjacent to one another, as there are positive films to be printed. The negative film 1, instead of passing in a guide-passage, is guided between a certain number of pairs of rollers 21, $21_1$, ... $21_5$. The spaces comprised between two consecutive pairs of rollers $21$—$21_1$, $21_1$—$21_2$ ... limit the various adjacent regions of the negative 1, which are projected on the various positives, i. e. each of these spaces forms a sort of projection window. In front of each of these windows an optical system is arranged, comprising particularly an objective 18, $18_1$, ... $18_5$. The different regions of the negative 1 (Figure 1) defined in this manner in the window 3 are projected, as indicated above, at different heights onto the various positives 6, $6_1$, ... $6_5$ through the windows 7, $7_1$ ... $7_5$ stepped in height.

Due to these optical devices, it will be seen that the filament, perpendicular to the plane of Figure 4, of the electric lamp 13 gives, in each of the individual lenses 15, $15_1$ ... $15_5$, an image which is projected through the windows 21—$21_1$, $21_1$—$21_2$ ... into each of the objectives 18, $18_1$ ... $18_5$ in order to give, on each of the positive films 6, $6_1$, ... $6_5$ projections of substantially the same illumination of these adjacent regions of the negative film.

Similarly, the various adjacent regions of the sound film 2 (Figure 2) are illuminated by an equivalent optical system through the window 4 and are projected onto the positive films through the windows 8, $8_1$, ... $8_5$ stepped in height.

In the case where the same machine serves to print simultaneously positives of various sizes, the objectives 18, $18_1$ ... $18_5$ will have various focal distances, since the reductions or magnifications are different. In this case, the lenses 15, $15_1$ ... $15_5$ will also have different focal distances corresponding to the different positions of the objectives 18, $18_1$ ... $18_5$.

It may be of advantage to use, for the condensers, nonspherical lenses, i. e. lenses whose surfaces, instead of being spherical, will for instance be elliptical. Such a form is convenient for the obtention of a high and narrow lens such as that required for the above application.

Figure 5 represents, on the upper side in plan, and on the lower side in front elevation, a device in which the image film and the sound film are projected by the same prisms, thus halving the number of prisms required on the machine.

The image film 1 and the sound film 2 are projected through the windows 22, 23 onto the same totally reflecting prism 24. The axis of the image beam is reflected along the line 25, 26 which is parallel to the guiding plate of the films 1 and 2, whilst the axis of the sound beam is reflected along the line 27, 28 which is slightly inclined. On these axes are disposed the objectives 29, 30. The same composite prism 31 receives the two beams and projects them side by side onto the positive 32 to be printed, through the single window 33.

In Figures 6 and 7 one has represented an illuminating device with a single lamp for the two negatives. The single lamp 35 is placed at the focus of a great lens 36 behind which are arranged two series of small lenses 37, 38 placed one above the other in front of the image negative 39 and the sound negative 40.

This single lamp 35 must have a fixed strength, and it is preferably arranged inside its lantern carrying the great lens 36 in a well-marked position, for instance in the manner in which are marked the lamps for the head-lights of automobiles inside their optical system in order to give a well defined and constant illumination. It is therefore necessary to provide an adjustment of the intensity of the beam illuminating the image film and of that of the sound film, in order to obtain, according to each region of each negative, the required intensity. As this adjustment is not obtained by varying the intensity of the lamp, it must be effected in a mechanical manner, for instance by means of one of the known processes, consisting in arranging, on the path of the beam, a slot with variable width or an adjustable set of glasses with different degrees of transparence.

For instance, in Figure 8, one has represented a system for the mechanical adjustment of the luminous intensity, of the type comprising a slot with variable width. Behind the guiding-passage of each one of the negatives, passage whose windows stepped in height, are for instance constituted as in Figure 4 by the pairs of rollers 21—$21_1$, $21_1$—$21_2$ ..., one has disposed a plate 41, movable in height and carrying a corresponding number of windows 42, $42_1$ ... This plate is supported by a muff $44_4$, which, by means of the device which will be described, may be displaced in height by a certain, more or less great amount, in a manner that the windows of the plate 41 shall close more or less the windows of the guiding-passage of the film. To this effect, one has mounted, about a fixed axis 43, a certain number, for instance five, eccentered muffs 44, $44_1$, ... $44_4$, one inside the other. Each of these muffs is ended, at one of its ends, by a toothed pinion respectively 45, $45_1$ ... These toothed pinions mesh with racks 46, $46_1$ ... which may be operated by electro-magnets 47, $47_1$ ... which may make the pinions turn by half a revolution. It will be easily understood that if a muff $44_4$ is turned by half a revolution, in order that with respect to the muff $44_3$ by which it is supported, its wider part be turned downwardly instead of being turned upwardly, the plate 41 which is integral with this muff, will be displaced downwardly by a length equal to the eccentricity of the muff $44_4$.

In order to realize, with a low number of muffs, for instance five, a great number of different, regularly spaced displacements of the plate 41, for instance something like twenty such displacements, as is necessary for obtaining a sufficiently precise adjustment of the intensity of the luminous beams of both image and sound, the eccentricities of the muffs 44, $44_1 \ldots 44_4$ are to one another substantially as a series of integers chosen in a manner to enable to form, by adding together a number of them suitably chosen, a series of consecutive numbers, reaching up to a certain value, higher than the number of the displacements required for the plate 41. The set of integers 1, 2, 3, 6, 12 is particularly suited for this purpose since it enables, by never using more than three of these integers, to form 22 different totals regularly spaced. The advantage of not controlling simultaneously more than three electro-magnets 47, $47_1, \ldots$ resides in the fact that these electro-magnets may then be controlled by a pilot band constituted by a simple film of normal size, which will not run the risk of being weakened by the perforations if there are never more than three of the latter to be found one next to the other.

This device will preferably also comprise an additional eccentric (not shown), enabling to perform, by hand, an adjustment correction depending upon the sensitivity of the emulsion of the positive films to be printed.

What I claim is:

1. A projection-printing machine having, in combination, a plurality of objective systems, means for simultaneously and continuously feeding a plurality of negative films each in optically connected relation to one of the objective systems, a plurality of reflectors each optically connected with all the objective systems, a plurality of objective systems, one corresponding to each negative film, associated with each reflector, for converging the light rays from the respective negative films after reflection by the reflectors, and means for simultaneously and continuously feeding a plurality of positive films in timed relation to the feeding of the negative films and each in optically connected relation to one of the reflecting systems and its associated second-named objective systems, whereby successive corresponding adjacent regions of all the negative films, as they are fed by the first-named feeding means, become successively connected optically by all the first-named objective systems with each reflecting system and its associated second-named objective systems and by each reflecting system and its associated second-named objective systems with successive regions of the corresponding positive film, as the positive films are fed by the second-named feeding means, to permit continuous and simultaneous projection printing of the said corresponding adjacent regions of all the negative films upon the said successive regions of all the positive films.

2. In a machine for the continuous projection printing of a plurality of negative films, each on a plurality of positive films, whereby all the films are arranged side by side, means for projecting on each positive different adjacent regions of each negative, these means comprising for each positive an optical system constituted of common reflecting members for the projection of the corresponding elementary regions of all the negatives, and parallelly disposed individual objectives spaced apart by a distance smaller than that of the corresponding negative films.

3. In a machine for the continuous projection printing of a plurality of negative films, each on a plurality of positive films, whereby all the films are arranged side by side, means for illuminating the negative films, means for projecting on each positive different adjacent regions of each negative, these means comprising for each positive an optical system constituted of common reflecting members for the projection of all the elementary light beams issued from the corresponding elementary regions of all the negatives, and parallelly disposed individual objectives the optical axes of which are shifted in respect of the axes of the images of the negative films formed by said common reflecting members.

4. In a machine for the continuous projection printing of a plurality of negative films, each on a plurality of positive films, whereby all the films are arranged side by side, means for illuminating the negative films, means for projecting on each positive different adjacent regions of each negative, these means comprising for each positive a first reflecting prism disposed in the path of all the light beams issued from the corresponding elementary regions of all the negatives, parallelly disposed individual objectives the optical axes of which are shifted in respect of the axes of the images of the negative films formed by said reflecting prism, and a second reflecting prism disposed in the path of the elementary light beams issuing in convergent relation from said shifted objectives and projecting said beams side by side on the same positive film.

MAURICE ALBERT DALOTEL.